United States Patent
Gatti

(10) Patent No.: US 9,825,974 B2
(45) Date of Patent: Nov. 21, 2017

(54) PHISHING WARNING TOOL

(71) Applicant: Bank of America Corporation, Charlotte, NC (US)

(72) Inventor: Benjamin L. Gatti, Lake Park, NC (US)

(73) Assignee: Bank of America Corporation, Charlotte, NC (US)

( * ) Notice: Subject to any disclaimer, the term of this patent is extended or adjusted under 35 U.S.C. 154(b) by 17 days.

(21) Appl. No.: 14/805,545

(22) Filed: Jul. 22, 2015

(65) Prior Publication Data

US 2017/0026389 A1    Jan. 26, 2017

(51) Int. Cl.
*H01L 29/06*    (2006.01)
*H04L 29/06*    (2006.01)

(52) U.S. Cl.
CPC ...... *H04L 63/1416* (2013.01); *H04L 63/1483* (2013.01); *H04L 63/145* (2013.01); *H04L 63/1433* (2013.01); *H04L 63/1441* (2013.01)

(58) Field of Classification Search
CPC ............. H04L 63/1433; H04L 63/1441; H04L 63/1483
See application file for complete search history.

(56) References Cited

U.S. PATENT DOCUMENTS

| | | | |
|---|---|---|---|
| 6,901,519 B1 * | 5/2005 | Stewart | G06F 21/56 709/206 |
| 7,356,564 B2 | 4/2008 | Hartselle et al. | |
| 7,499,976 B2 | 3/2009 | Cato | |
| 7,603,718 B2 | 10/2009 | Rounthwaite et al. | |
| 7,841,003 B1 * | 11/2010 | Emdee | G06F 21/51 726/22 |
| 7,908,328 B1 | 3/2011 | Hulten et al. | |
| 7,925,883 B2 | 4/2011 | Florencio et al. | |
| 7,930,289 B2 | 4/2011 | Cheshire | |
| 8,041,769 B2 | 10/2011 | Shraim et al. | |
| 8,255,468 B2 | 8/2012 | Vitaldevara et al. | |
| 8,352,318 B2 | 1/2013 | Rikhtverchik et al. | |
| 8,381,292 B1 | 2/2013 | Warner et al. | |
| 8,484,741 B1 | 7/2013 | Chapman | |
| 8,615,807 B1 | 12/2013 | Higbee et al. | |
| 8,621,614 B2 | 12/2013 | Vaithilingam et al. | |
| 8,635,666 B2 | 1/2014 | Curnyn | |
| 8,635,703 B1 | 1/2014 | Belani et al. | |
| 8,640,231 B2 | 1/2014 | Florencio et al. | |
| 8,689,341 B1 | 4/2014 | Hartmann et al. | |
| 8,695,100 B1 | 4/2014 | Cosoi | |
| 8,719,940 B1 * | 5/2014 | Higbee | H04L 63/1408 709/206 |
| 8,793,799 B2 | 7/2014 | Fritzson et al. | |
| 8,910,287 B1 | 12/2014 | Belani et al. | |
| 8,966,637 B2 | 2/2015 | Belani et al. | |

(Continued)

*Primary Examiner* — Carol Colin
*Assistant Examiner* — Gary Lavelle
(74) *Attorney, Agent, or Firm* — Michael A. Springs

(57) ABSTRACT

According to one embodiment, an apparatus includes a memory and a processor. The processor is configured to receive an email and to detect a click of a button that indicates that a user should be warned about the email being a phishing email. In response to detecting the click of the button, the processor can generate a new email and add a deactivated representation of the received email to the new email. The processor may communicate the new email to the user.

9 Claims, 3 Drawing Sheets

(56) References Cited

U.S. PATENT DOCUMENTS

| | | | |
|---|---|---|---|
| 9,027,126 B2* | 5/2015 | Larkins | G06F 21/554 |
| | | | 713/182 |
| 2008/0172738 A1* | 7/2008 | Bates | G06F 17/30887 |
| | | | 726/22 |
| 2010/0306845 A1* | 12/2010 | Vaithilingam | G06Q 10/107 |
| | | | 726/23 |
| 2012/0046937 A1 | 2/2012 | Ocke et al. | |
| 2012/0124671 A1* | 5/2012 | Fritzson | G06F 21/577 |
| | | | 726/26 |
| 2013/0297375 A1 | 11/2013 | Chapman | |
| 2014/0337995 A1 | 11/2014 | Fritzson et al. | |
| 2015/0012351 A1 | 1/2015 | Harding | |
| 2016/0014151 A1* | 1/2016 | Prakash | H04L 63/1483 |
| | | | 726/22 |

* cited by examiner

PHISHING WARNING TOOL

TECHNICAL FIELD

This disclosure relates generally to a system for handling phishing emails.

BACKGROUND

Phishing emails and phishing campaigns place computing systems and networks at risk.

SUMMARY OF THE DISCLOSURE

According to one embodiment, an apparatus includes a memory and a processor. The processor is configured to receive an email and to detect a click of a button that indicates that a user should be warned about the email being a phishing email. In response to detecting the click of the button, the processor can generate a new email and add a deactivated representation of the received email to the new e-mail. The processor may communicate the new email to the user.

According to another embodiment, a method includes receiving an email and detecting, by a processor, a click of a button that indicates that a user should be warned about the email being a phishing email. In response to detecting the click of the button, generating a new email and adding a deactivated representation of the received email to the new email. The method concludes by communicating the new email to the user.

According to another embodiment, a system includes a mail server and a device. The mail server is configured to receive an email. The device is configured to detect a click of a button that indicates that a user should be warned about the email being a phishing email. In response to detecting the click of the button, the device can generate a new email and add a deactivated representation of the received email to the new email. The device can communicate the new email to the user.

Certain embodiments may provide one or more technical advantages. For example, an embodiment may reduce the chances of spreading a phishing email. As another example, an embodiment may reduce the effectiveness of phishing emails. Certain embodiments way include none, some, or all of the above technical advantages. One or more other technical advantages may be readily apparent to one skilled in the art from the figures, descriptions, find claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
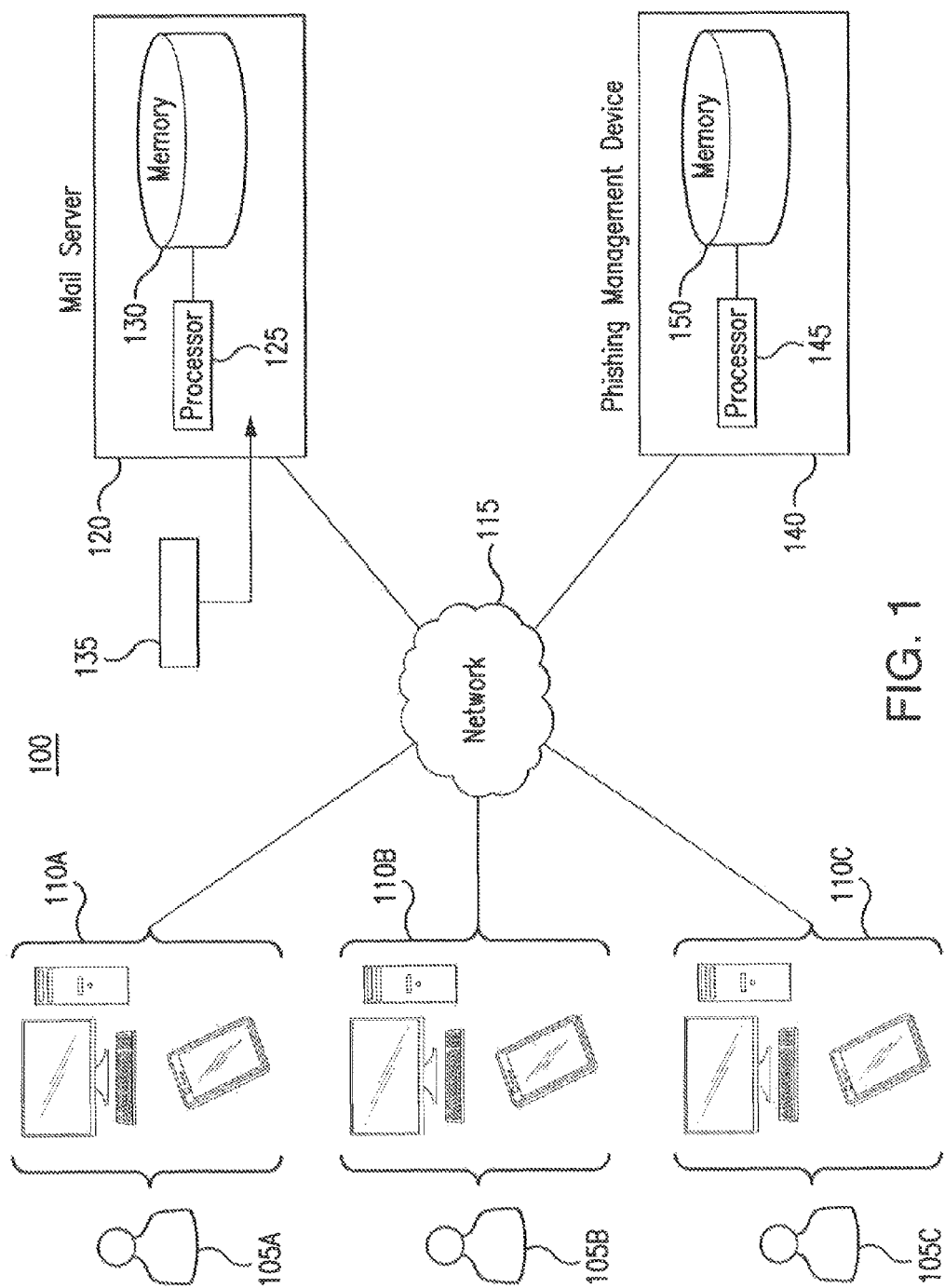
FIG. 1 illustrates a system for handling phishing emails.
Figure 2:
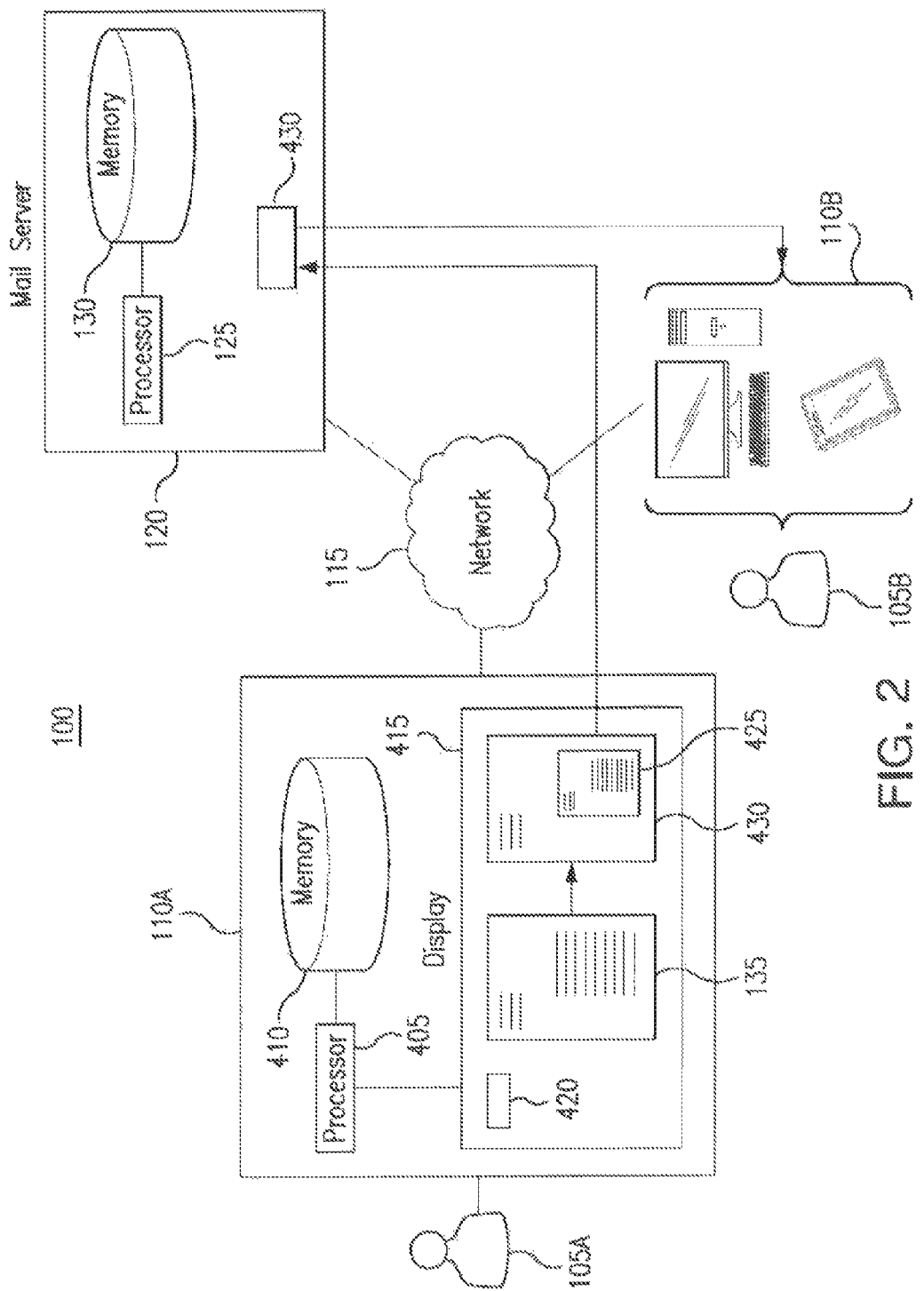
FIG. 2 illustrates warning of a phishing email using the system of FIG. 1.
Figure 3:
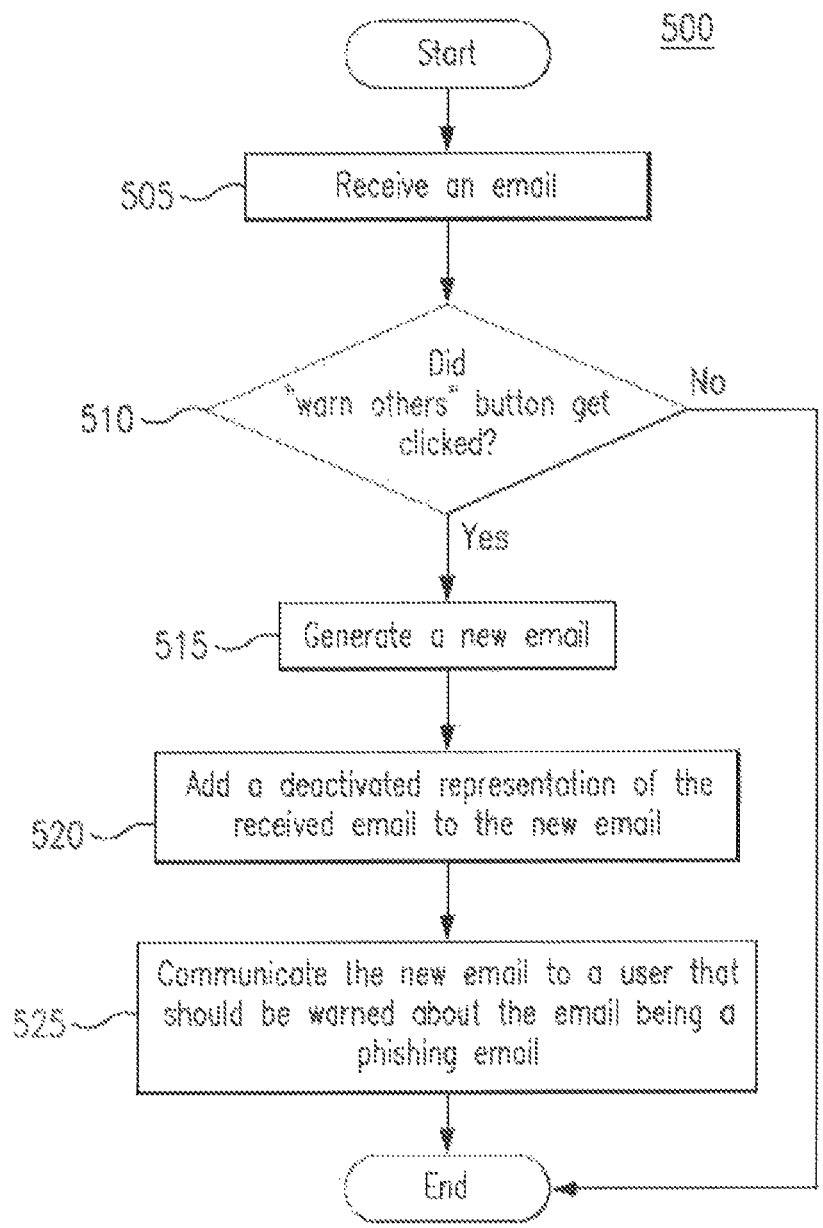
FIG. 3 is a flowchart illustrating a method of warning of a phishing email using the system of FIG. 1.

Embodiments of the present disclosure and its advantages are best understood by referring to FIGS. 1 through 3 of the drawings, like numerals being used for like and corresponding parts of the various drawings.

Phishing scams place computing systems and networks at substantial risk. Phishing typically involves the sending of emails and/or messages that attempt to deceive the recipient into providing personally identifiable information, passwords, and any other information that, when known by an unauthorized party, may threaten the security of the system and/or network. Phishing may also involve sending emails and/or messages that deceive the recipient into installing viruses and/or worms onto the recipient's device. Because the success of a phishing scam may depend on the response of only one recipient and because the number of recipients may be large, it may be difficult to prevent a phishing scam from jeopardizing the security of a system and/or network. For example, if a phishing email is sent to one thousand users on a network it may be difficult to ensure that all one thousand users do not fall victim to the phishing email.

This disclosure provides a system that may reduce the chances that a user falls victim to a phishing seam. The system may allow a user to warn others of a phishing email without rendering the other users susceptible to the phishing email. For example, the system may communicate a deactivated representation of the phishing email to the other users. In certain embodiments, by using this system, various technical advantages may be realized. For example, in one embodiment using the system may reduce the chances of spreading a phishing email. As another example, in another embodiment the system may reduce the effectiveness of phishing emails. The system will be described generally using FIG. 1. The various functions performed by the system will be described in more detail using FIGS. 2 and 3. Although this disclosure primarily describes phishing within the context of email, this disclosure contemplates phishing scams within any messaging context including text messaging, chat messaging, and/or any other appropriate messaging scheme.

FIG. 1 illustrates a system 100 for handling phishing emails. As provided in FIG. 1, system 100 includes users 105A, 105B and 105C, devices 110A, 110B, and 110C, network 115, mail server 120, and phishing management device 140. The components of system 100 may be communicatively coupled to each other through network 115. For ease of illustration, the number of illustrated components of system 100 is limited, but this disclosure contemplates system 100 including any number of users 105, devices 110, networks 115, mail servers 120, and phishing management devices 140.

A user 105 may use device 110 to perform various functions related to email. For example, user 105 may use device 110 to compose email, read email, reply and/or forward email, and/or delete email. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 may facilitate communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Mail server 120 may handle the email traffic of system 100. As provided in FIG. 1, mail server 120 may include a processor 125 and a memory 130. Processor 125 and memory 130 may be communicatively coupled to each other. This disclosure contemplates processor 125 and memory 130 being configured to perform any of the functions of mail server 120 described herein. For example, processor 125 and memory 130 may be configured to receive email and/or store email.

Processor 125 may execute software stored on memory 130 to perform any of the functions described herein. Processor 125 may control the operation and administration of mail server 120 by processing information received from network 115, device 110, and memory 130. Processor 125 may include any hardware and/or software that operates to control and process information. Processor 125 may be a programmable logic device, a microcontroller, a microprocessor, any suitable processing device, or any suitable combination of the preceding.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Mail server 120 may manage the email traffic of system 100. For example, mail server 120 may receive an email 135. Mail server 120 may then determine which user 105 is the intended recipient of email 135. Mail server 120 may then deliver email 135 to the appropriate device 110. Mail server 120 may also store email 135. When a user 105 uses device 110 to reply, forward, and/or delete email 135, mail server 120 may receive a command from the device 110. Mail server 120 may then respond appropriately to the command.

Phishing management device 140 may track and/or handle phishing emails received by system 100. As provided in FIG. 1, phishing management device 140 includes a processor 145 and a memory 150. This disclosure contemplates processor 145 and memory 150 being configured to perform any of the functions of phishing management device 140 described herein. Processor 145 may be communicatively coupled to memory 140.

Processor 145 may execute software stored on memory 150 to perform any of the functions described herein. Processor 145 may control the operation and administration of phishing management device 140 by processing information received from network 115, device 110, and memory 150. Processor 145 may include any hardware and/or software that operates to control and process information. Processor 145 may be a programmable logic device, a microcontroller, a microprocessor, any suitable processing device, or any suitable combination of the preceding.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

Phishing management device 140 may perform various functions to reduce the effectiveness of phishing scams. For example, system 100 may allow a user 105 to warn others about a phishing email. When user 105 indicates that others should be warned about the phishing email, system 100 may generate a deactivated representation of the phishing email so that others will not fall victim to that phishing email. The deactivated representation may be included or form part of an email that may be sent to other users. In this manner, system 100 may provide a safe alternative to forwarding and distributing unsafe emails to others for the purpose of warning them. Warning of a phishing email will be discussed in more detail using FIGS. 2 and 3.

FIGS. 2 and 3 illustrate a user warning of a phishing email using the system 100 of FIG. 1. When a user receives an email that the user believes is a phishing email, the user may try to warn others about the email so that they do not fall victim to it. However, in warning other users, the user may forward the phishing email so that the other users can see what the phishing email looks like. In so doing, the user spreads the phishing email to others and increases the number of users who become susceptible to the phishing email.

System 100 may provide a way for the user to warn others about the phishing email without sending the phishing email to other users. A user who receives a phishing email may press a button on the user's device to add a deactivated representation of the phishing email to a new email. The deactivated representation may be an image of the phishing email or a version of the phishing email with links deactivated. The deactivated representation may also have any attachments removed. By allowing the user to send a deactivated representation of the phishing email to others, system 100 allows the user to let others know what the phishing email looks like without causing other users to be vulnerable to the phishing email.

FIG. 2 illustrates warning of a phishing email using the system 100 of FIG. 1. As provided in FIG. 2, device 110A may include a processor 405 and a memory 410. Processor 405 may be communicatively coupled to memory 410. Device 110A may also include a display 415 communicatively coupled to processor 405. This disclosure contemplates processor 405, memory 410, and display 415 being configured to perform any of the functions of device 110A described herein. For clarity, certain elements of system 100 have not been illustrated in FIG. 2, but their omission should not be construed as their elimination from system 100.

Processor 405 may execute software stored on memory 410 to perform any of the functions described herein. Processor 405 may control the operation and administration of device 110 by processing information received from network 115, mail server 120, and memory 410. Processor 405 may include any hardware and/or software that operates to control and process information. Processor 405 may be a programmable logic device, a microcontroller, a microprocessor, any suitable processing device, or any suitable combination of the preceding.

Memory 410 may store, either permanently or temporarily, data, operational software, or other information for processor 405. Memory 410 may include any one or a combination of volatile or non-volatile local or remote devices suitable for storing information. For example, memory 410 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 410, a disk, a CD, or a flash drive. In particular embodiments, the software may include an application executable by processor 405 to perform one or more of the functions described herein.

Device 110A may provide a button 420 that user 105A may press to warn others of a suspected phishing email. When device 110A receives an email 135, user 105A may review email 135 on device 110A. For example, device 110A may display email 135 on display 415. After reading email 135, if user 105A suspects email 135 is a phishing email, user 105A may press button 420 to warn others of the suspected phishing email. As illustrated in the example of FIG. 2, button 420 may be a soft button displayed on display 415. In this instance, user 105A may press button 420 by using a keyboard, a mouse, or a touchscreen of device 110. This disclosure contemplates button 420 being any appropriate button of device 110A including a hardware button and/or a software button.

This disclosure contemplates user 105A indicating to device 110A that others should be warned about email 135 in any appropriate manner. For example, user 105A may talk to device 110A, shake device 110A, and/or perform a gesture or action detectable by device 110A to indicate that others should be warned about email 135.

When device 110A detects that user 105A has pressed button 420, device 110A may generate a new email 430. New email 430 may be sent to warn others about the suspected phishing email. Device 110A may add a deactivated representation 425 of email 135 to new email 430. The deactivated representation 425 may allow others to see what the suspected phishing email looks like without causing the other users to be susceptible to the suspected phishing email. This disclosure contemplates deactivated representation 425 being of any appropriate form or type. In the illustrated example of FIG. 2, deactivated representation 425 includes an image of email 135. In particular embodiments, deactivated representation 425 may include a version of email 135 that includes deactivated links. In other embodiments, deactivated representation 425 may include a version of email 135 but with links that have altered destinations. For example, links within email 135 may be changed so that they direct to safe websites. In certain embodiments, device 110A may also remove any attachments included in email 135 to generate deactivated representation 425.

In particular embodiments, device 110A may acid a text description of email 135 to new email 430. In this manner, a recipient of new email 430 may not need to view the deactivated representation 425 to learn of the suspected phishing email.

User 105A may send new email 430 to other users, such as user 105B, to warn them about the suspected phishing email. When user 105A instructs device 110A to send new email 430, device 110A may send new email 430 to mail server 120. After receiving new email 430, mail server 120 may communicate new email 430 to other users such as user 105B. In particular embodiments, user 105B may open new email 430 and see deactivated representation 425. In this manner, user 105B may be warned about what the suspected phishing email looks like without being susceptible or falling victim to the suspected phishing email.

In particular embodiments, device 110A may populate a "To" field of new email 430. In this manner, device 110A may set a plurality of users as recipients of new email 430. This disclosure contemplates device 110A determining the plurality of users in any appropriate way. For example, device 110A may determine the plurality of users based on the recipients of an email previously generated by the user 105A pressing button 420. If user 105A previously sent an email to users 105B and 105C, device 110A may set the "To" field of new email 430 to users 105B and 105C.

In particular embodiments, device 110A may prevent forwarding of email 135 after user 105A presses button 420. In this manner, device 110A may prevent user 105A from inadvertently spreading the suspected phishing email.

FIG. 3 is a flowchart illustrating a method 500 of warning of a phishing email using the system 100 of FIG. 1. In particular embodiments, device 110A may perform method 500. This disclosure contemplates any device 110 of system 100 performing method 500. In certain embodiments, by performing method 500 device 110A may provide user 105A a way to warn others of a suspected phishing email without causing other users to become susceptible to the suspected phishing email.

Device 110A may begin by receiving an email in step 505. In step 510, device 110A may determine whether a button was pressed indicating that others should be warned about the received email. For example, the button may have text written on the button such as "warn others" indicating that a press of the button will warn others of a received email. If device 110A determines that the button was not pressed or clicked, device 110A may conclude.

If device 110A determines that the button was pressed or clicked, device 110A may continue to step 515 to generate a new email. Device 110A may then add a deactivated representation 425 of the received email to the new email in step 520. In particular embodiments, the deactivated representation 425 may be an image of the received email. In certain embodiments, the deactivated representation 425 may be a version of the received email where links in the received email have been deactivated and/or altered. In particular embodiments, device 110A may also remove any attachments on the received email to generate the deactivated representation.

In step 525, device 110A may communicate the new email to a user that should be warned about the email being a phishing email. When the user receives the new email, the user may read the new email to understand what, the suspected phishing email looks like but the user may not be susceptible or fall victim to the phishing email.

Modifications, additions, or omissions may be made to method 500 depicted in FIG. 3. Method 500 may include more, fewer, or other steps. For example, steps may be performed in parallel or in any suitable order. While discussed as device 110 performing the steps, any suitable component of system 100, such as mail server 120 or phishing management server 140 for example, may perform one or more steps of the method.

This disclosure contemplates users 105A, 105B and 105C responding to phishing emails in any appropriate manner. For example, users 105A, 105B and 105C may respond to a phishing email by clicking a link in the phishing email. As another example, users 105A, 105B and 105C may respond to a phishing email by replying to it. As another example, users 105A, 105B and 105C may respond to a phishing email by opening an attachment in the phishing email. As further examples, users 105A, 105B, and 105C may respond by forwarding the phishing email, deleting the phishing email, opening the phishing email, opening the phishing email, reading the phishing email, opening an attachment in the phishing email, calling a phone number in the phishing email, and/or reporting the phishing email.

Modifications, additions, or omissions may be made to system 100 without departing from the scope of the invention. For example, phishing management device 14 may be a distributed system. As another example, the components of system 100 may be integrated or separated. For example, mail server 120 may be incorporated into phishing management device 140, and vice versa.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fell within the scope of the appended claims.

What is claimed is:

1. An apparatus comprising:
a memory; and
a processor communicatively coupled to the memory, the processor configured to:
receive a first email comprising a first link and an attachment;
detect a click of a button that indicates that a user should be warned about the email being a phishing email;
in response to detecting the click of the button:
generate a new email;
alter a destination of the first link to produce a second link;
remove the attachment from the first email to produce a second email; and
add a deactivated representation of the second email to the new email, wherein the deactivated representation comprises an image of the second email and the second link;
communicate the new email to the user; and
set a plurality of users as recipients of the new email, the plurality of users determined based on a plurality of recipients of a previous email generated in response to a previous detection of a click of the button.

2. The apparatus of claim 1, wherein the processor is further configured to add a text description of the received email to the new email.

3. The apparatus of claim 1, wherein the processor is further configured to prevent forwarding of the received email.

4. A method comprising
receiving a first email comprising a first link and an attachment;
detecting, by a processor, a click of a button that indicates that a user should be warned about the email being a phishing email;
in response to detecting the click of the button:
generating a new email;
altering a destination of the first link to produce a second link;
removing the attachment from the first email to produce a second email; and
adding a deactivated representation of the second email to the new email, wherein the deactivated representation comprises an image of the second email and the second link;
communicating the new email to the user; and
setting a plurality of users as recipients of the new email, the plurality of users determined based on a plurality of recipients of a previous email generated in response to a previous detection of a click of the button.

5. The method of claim 4, further comprising adding a text description of the received email to the new email.

6. The method of claim 4, further comprising preventing forwarding of the received email.

7. A system comprising:
a mail server configured to receive a first email comprising a first link and an attachment; and
a device configured to:
detect a click of a button that indicates that a user should be warned about the email being a phishing email;
in response to detecting the click of the button:
generate a new email;
alter a destination of the first link to produce a second link;
remove the attachment from the first email to produce a second email; and
add a deactivated representation of the second email to the new email, wherein the deactivated representation comprises an image of the second email and the second link;
communicate the new email to the user; and
set a plurality of users as recipients of the new email, the plurality of users determined based on a plurality of recipients of a previous email generated in response to a previous detection of a click of the button.

8. The system of claim 7, wherein the device is further configured to add a text description of the received email to the new email.

9. The system of claim 7, wherein the device is further configured to prevent forwarding of the received email.

* * * * *